Oct. 13, 1936.                J. DE BACKER                    2,057,559
                           MULTIPLE CLUTCH DEVICE
                            Filed May 6, 1935              4 Sheets-Sheet 1

Oct. 13, 1936.  J. DE BACKER  2,057,559
MULTIPLE CLUTCH DEVICE
Filed May 6, 1935  4 Sheets-Sheet 2

Inventor:
Joseph de Backer.
By William C. Linton
Atty.

Oct. 13, 1936.    J. DE BACKER    2,057,559
MULTIPLE CLUTCH DEVICE
Filed May 6, 1935    4 Sheets-Sheet 3

Inventor:
Joseph de Backer.
By William E. Linton
Atty.

Oct. 13, 1936.    J. DE BACKER    2,057,559
MULTIPLE CLUTCH DEVICE
Filed May 6, 1935    4 Sheets-Sheet 4
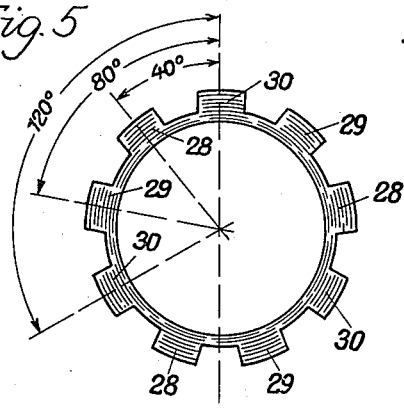
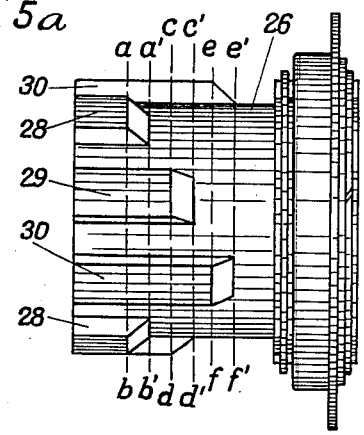
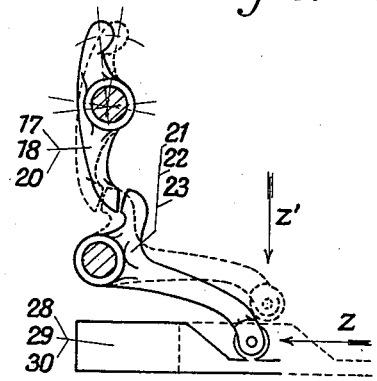
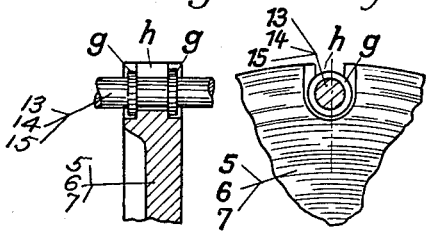
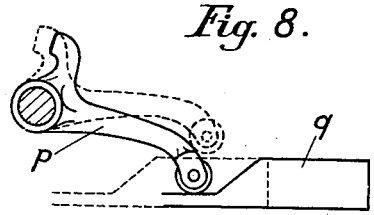
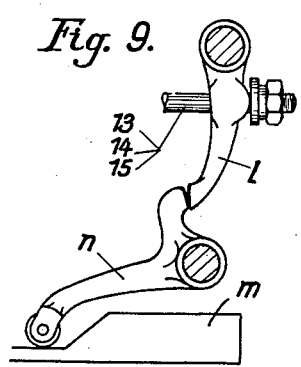
Inventor:
Joseph de Backer.
By William C. Linton
Atty.

Patented Oct. 13, 1936

2,057,559

UNITED STATES PATENT OFFICE 2,057,559

MULTIPLE CLUTCH DEVICE

Joseph de Backer, Uccle-Brussels, Belgium

Application May 6, 1935, Serial No. 20,071
In Belgium May 11, 1934

5 Claims. (Cl. 192—48)

The present invention relates to a multiple-clutch applicable to any kind of engine for successively driving a plurality of concentric shafts, and composed of a plurality of individual or distinct clutches having a common release sleeve.

According to the invention, each of the individual clutches comprises a drum in which are positioned a driven plate, carried by one of the concentric shafts, and a pressure plate, and the drums are connected to each other and are together connected to the flywheel of the engine, the pressure plate of each individual clutch being connected to springs and to levers by means of rods. A common release sleeve acting upon said levers is provided with longitudinal cams comprising slopes cut between successive pairs of transverse planes in such a way that the slopes of the cams corresponding to the levers of one and the same individual clutch extend between the same pair of transversal planes, so that the longitudinal cams can successively operate or put out of action, the levers of the individual clutches, in order to disengage or engage successively the driven plates when the release sleeve is moved longitudinally in one or the other direction, for instance, with the aid of a pedal or a lever.

By this combination, a multiple clutch is obtained in which the release sleeve successively disengages the concentric shafts from the flywheel of the engine without communicating further movement to the individual clutches already disengaged while it disengages the following one, and without being further subjected to the pressure of the springs of the individual clutches already disengaged, and in which the release sleeve successively engages the concentric shafts with the flywheel of the engine without communicating any further movement to the individual clutches already engaged while it engages the following one, and without being subjected to the pressure of the springs of the individual clutches still to be engaged.

The combination according to the invention makes it possible to construct, according to the intended use, a multiple clutch which may be composed of a variable number of distinct clutches in accordance with the number of concentric shafts to be successively driven.

The multiple clutch described in the present specification is particularly applicable to the change-speed device forming the subject of the United States Patent No. 1,814,297. In this change-speed device, the concentric shafts to be successively driven are three in number. Consequently, the accompanying drawings illustrate by way of example, a multiple clutch composed of three individual clutches and designed for driving three concentric shafts such as described in United States Patent No. 1,814,297. In the said patent, the concentric shafts bear the same reference numbers 1, 19 and 33 as in the accompanying drawings. In these drawings:—

Figure 1:
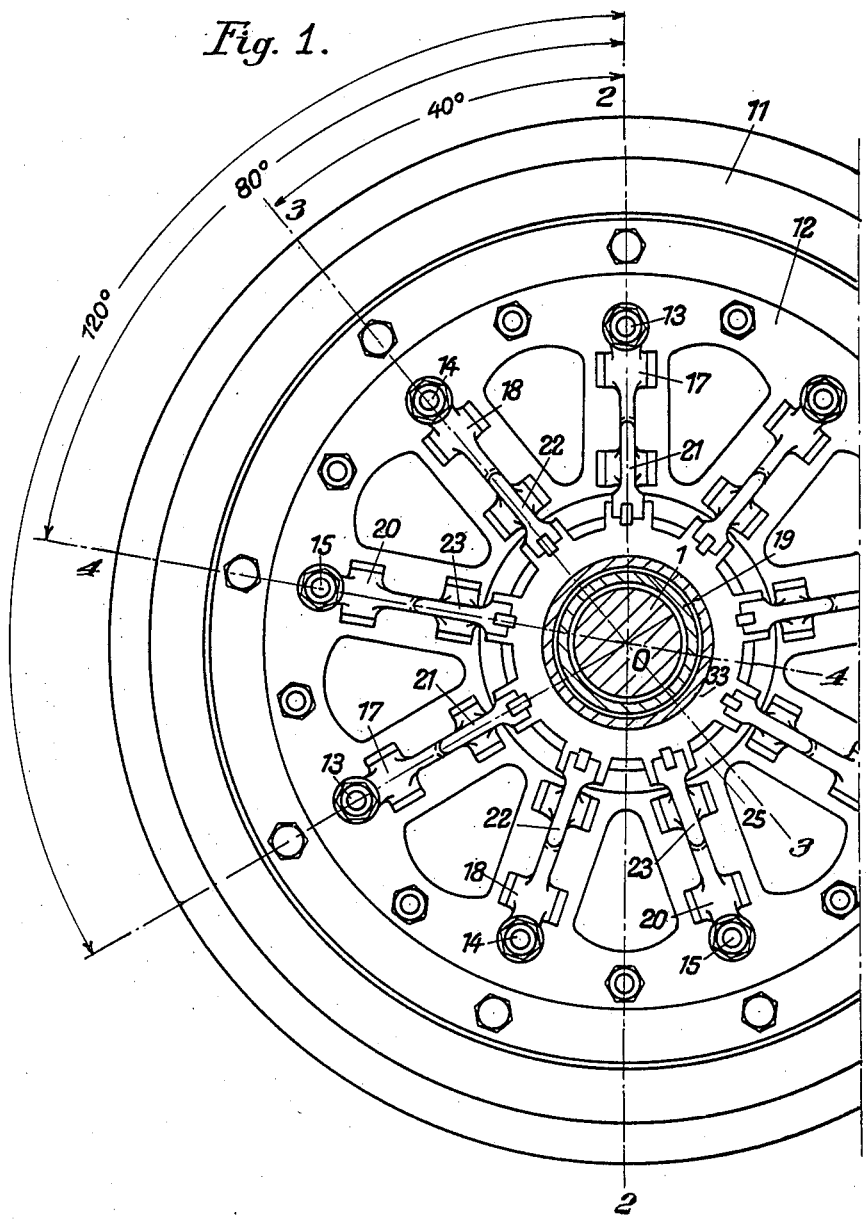
Fig. 1 is a view of the multiple clutch from the cover side, the release sleeve being removed.
Figure 3:
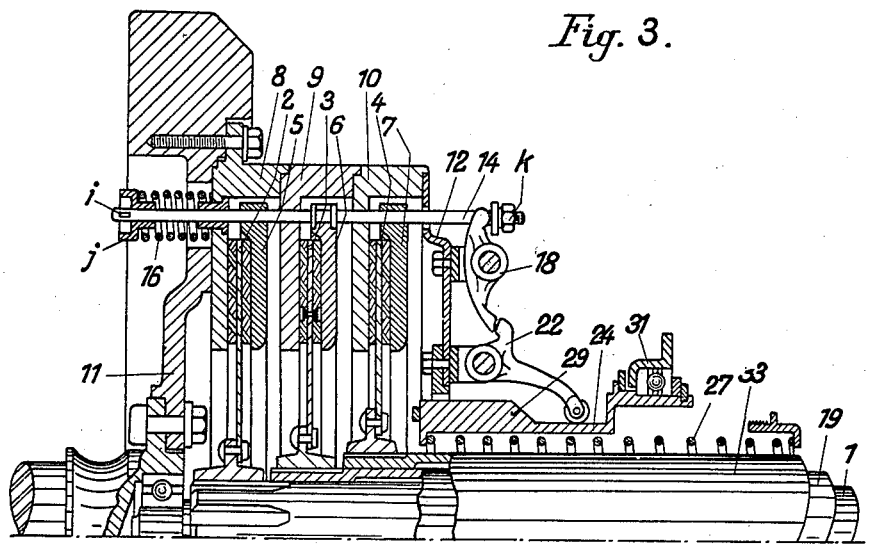

Fig. 3 is a longitudinal section on the line 3—3 up to the centre 0 of Fig. 1 and displaced by 40° from the section on the line 2—2.

Figure 4:
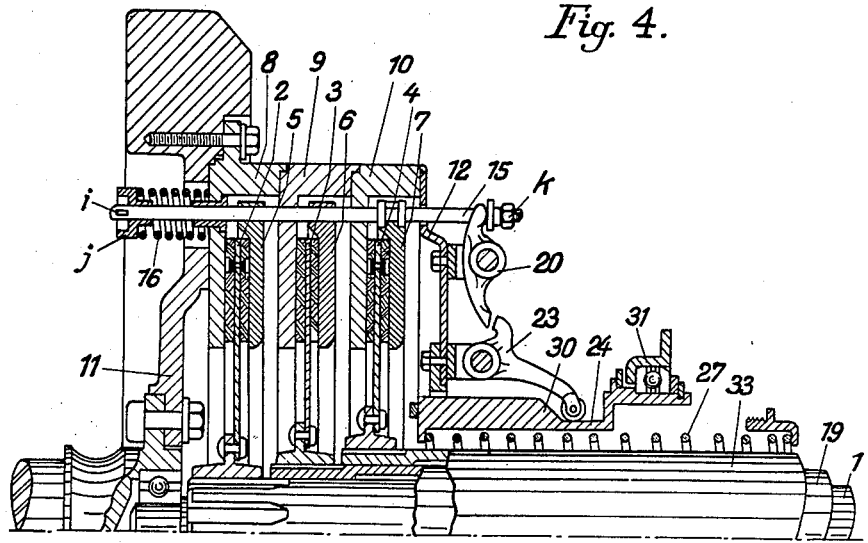

Fig. 4 is a longitudinal section on the line 4—4 up to the centre 0 of Fig. 1, and displaced by 80° from the section on the line 2—2.

Fig. 5 is a front view of the release sleeve of the multiple clutch.

Fig. 5a is a side elevation of the release sleeve of the multiple clutch.

Fig. 6 illustrates the movement of the levers, the rocker levers and the cams of the release sleeve.

Figs. 7 and 7a show, by way of example, means for connecting the rods to the pressure plates.

Figs. 8 and 9 show, by way of example, two modified arrangements of the levers, the rocker levers and the cams of the release sleeve.

In the drawings, the shaft 1, the hollow shaft 19 and the hollow shaft 33 form three concentric shafts. The shaft 1 carries, on splines, a driven plate 2; the hollow shaft 19 carries, on splines, a driven plate 3 and the hollow shaft 33 carries, likewise on splines, a driven plate 4. Pressure plates 5, 6 and 7 correspond to the driven plates 2, 3 and 4 respectively. The driven plate 2 and the pressure plate 5 are positioned in a drum 8 which is connected to the flywheel 11 of the engine; the driven plate 3 and the pressure plate 6 are positioned in a drum 9 which is connected to the drum 8, and the driven plate 4 and the pressure plate 7 are positioned in a drum 10 which is connected to the drum 9. The drums 8, 9 and 10 are together fixed to the flywheel 11 and are closed by a cover 12 fixed to the drum 10.

Rods 13, 14 and 15, each of which being three in number, are disposed over the circumference of the clutches, but outside the circumference of the driven plates 2, 3 and 4.

The rods 13 are connected by suitable connecting means to the pressure plate 5, and similarly, the rods 14 are connected to the pressure plate 6, and the rods 15 to the pressure plate 7. The rods 13, 14 and 15 are arranged upon their respective pressure plates at spaces of 120° from each other and, all taken together, they are disposed at spaces of 40° from each other irrespective of the pressure plate to which they belong. The means for connecting the rods 13, 14 and 15 with the pressure plates 5, 6 and 7 respectively may, for instance, consist of collars g with which the rods 13, 14 and 15 are provided and which engage in slots h formed in the circumference of the pressure plates 5, 6 and 7, as shown in Figs. 7 and 7a, or they may consist of any other suitable means.

A clutch spring 16 is mounted upon each of the rods 13, 14 and 15. The springs 16 bear against the drum 8 and exert their pressure upon the rods 13, 14 and 15, for instance, by means of a washer j held in position by a pin i. The springs 16 mounted upon the rods 13 thus exert pressure upon the pressure-plate 5; likewise, the springs 16 of the rods 14 exert pressure upon the pressure plate 6 and the springs 16 of the rods 15 exert pressure upon the pressure plate 7.

Levers 17, 18 and 20, each of which being three in number, are disposed radially upon the cover 12 and can oscillate upon the latter. Each lever 17 corresponds to a rod 13, each lever 18 to a rod 14 and each lever 20 to a rod 15. The levers 17, 18 and 20 bear at their outer ends against their respective rods 13, 14 and 15, for instance, by means of an adjustable stop k mounted upon each of said rods.

Rocker-levers 21, 22, and 23, each of which being three in number, are likewise disposed radially upon the cover 12 and can rock upon the same. Each rocker-lever 21 corresponds to a lever 17, each rocker-lever 22 to a lever 18, and each rocker-lever 23 to a lever 20. The rocker-levers 21, 22 and 23 bear at their upper ends against the inner ends of the respective levers 17, 18 and 20.

A hub 25 is provided on the cover 12 and comprises slots corresponding each to a rocker-lever 21, 22 and 23.

A sleeve 24 is supported in the hub 25 and is longitudinally movable but cannot rotate in the hub 25. The sleeve 24 is provided with an annular portion 26 and with longitudinal cams 28, 29 and 30, which are three in number each.

The cams 28 comprise, towards the annular portion 26 of the sleeve 24, slopes which are cut between transverse planes a—b and a'—b', the plane a—b comprising the tops, and the plane a'—b' comprising the bases of the said slopes. Likewise, the cams 29 comprise, towards the annular portion 26, slopes cut between a transverse top plane c—d and a transverse base plane c'—d', and the cams 30 comprise slopes cut between a transverse top plane e—f and a transverse base plane e'—f'. The plane e—f of the tops of the slopes of cams 30 is situated before the plane c'—d' of the bases of the slopes of cams 29, and likewise, the top plane c—d of the slopes of cams 29 is situated before the base plane a'—b' of the slopes of cams 28. The interspace between the planes a—b and a'—b', the planes c—d and c'—d', and the planes e—f and e'—f' is determinated by the ratio between the desired height of the cams 28, 29 and 30 and the suitable inclination of the slopes of said cams. Each cam 28 corresponds to a rocker-lever 21, each cam 29 to a rocker-lever 22 and each cam 30 to a rocker-lever 23.

The cams 28, 29 and 30 form between themselves splines on the sleeve 24 and fit in the corresponding slots of the hub 25. In this way, the sleeve 24 is prevented from rotating in the hub 25. A spring 27, located between the hub 25 and the sleeve 24, exerts the return pressure upon said sleeve 24. The latter is furthermore provided with a release bearing 31, through the medium of which a throw-out fork 32 can move this sleeve 24 in a longitudinal stroke. The fork 32 in turn can be operated by a clutch pedal or lever (not shown) or by any suitable operating systems, such as pneumatic, hydraulic, electrical, depression systems or others.

The stroke of the sleeve 24 is in one direction divided into three successive clutching periods and, in the opposite direction, into three similar successive periods of disengagement, each of which corresponds to one-third of the total stroke of the sleeve 24. The clutch pedal or lever or any other operating system (not shown) which causes the sleeve 24 to move, will in turn likewise assume three successive clutching positions in one direction, and three successive positions of disengagement in the opposite direction.

Figure 2:
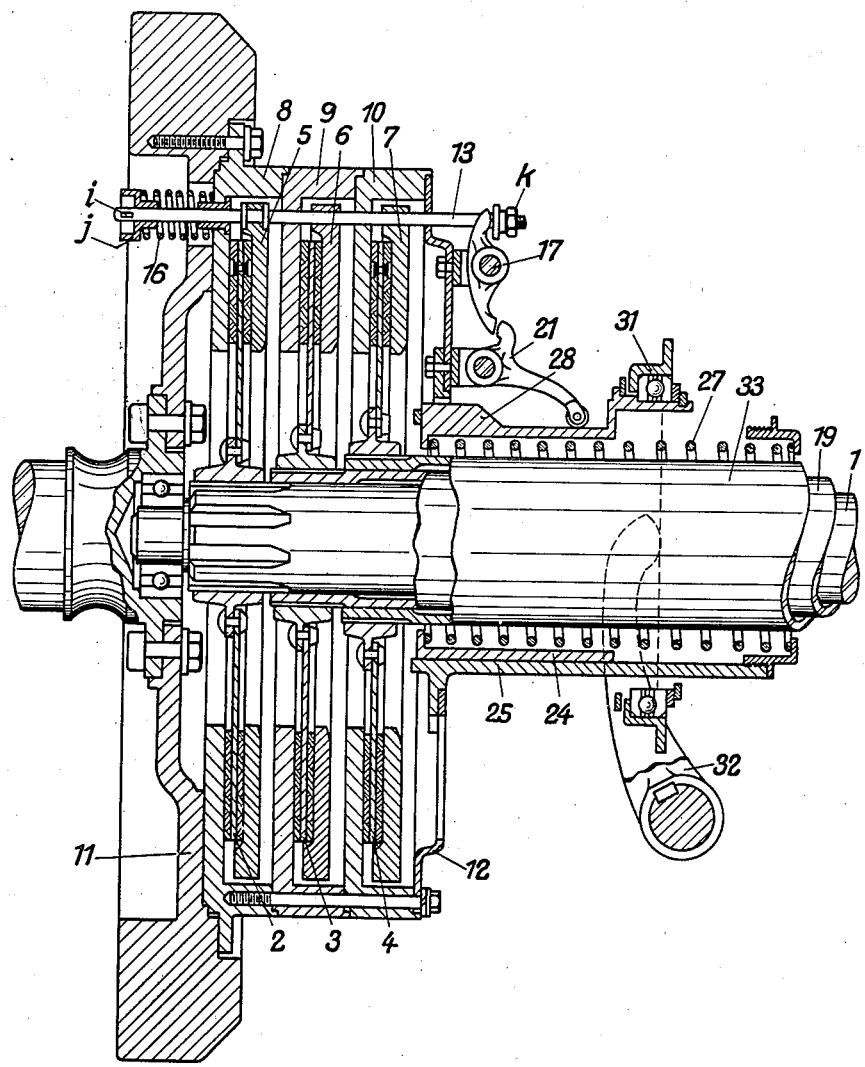
Fig. 2 is a longitudinal section on the line 2—2 of Fig. 1.

In Figs. 2, 3 and 4, the sleeve 24 is shown at the end of its clutching stroke and the rocker-levers 21, 22 and 23 contact at their under ends with the annular portion 26 of the sleeve. All the individual clutches are thus in the position of engagement.

When the sleeve 24 is moved by the first third of its disengaging stroke, the cams 30 of the sleeve cause the rocker-levers 23 to rock and the latter cause the levers 20 to oscillate according to the movement illustrated in Fig. 6. The levers 20 pull the rods 15 back and the latter throw the pressure plate 7 out of clutching. The driven plate 4 and the hollow shaft 33 are thus released. The pressure exerted by the springs 16 of this individual clutch upon the sleeve 24, through the medium of the rods 15, the levers 20 and the rocker-levers 23, which pressure was acting axially in the direction of the arrow z at the moment of disengagement, is transformed, after the de-clutching movement, into a radial pressure in the direction of the arrow z' and is thus practically inactive (Fig. 6).

As the slopes of cams 29 and 28 extend between transverse planes situated behind the transverse planes of the slopes of the cams 30, the sleeve 24 has not communicated any movement to the individual clutches of the shafts 19 and I, which have therefore remainded in engagement.

When the sleeve 24 is moved by a second third of its de-clutching stroke, the cams 29 of the sleeve cause the rocker-levers 22 to rock and the latter cause the levers 18 to oscillate, likewise as illustrated in Fig. 6. The levers 18 pull the rods 14 back and the latter throw the pressure plate 6 out of clutching. The driven plate 3 and the hollow shaft 19 are thus released. The pressure exerted by the springs 16 of this individual clutch upon the sleeve 24 through the medium of the rods 14, the levers 18 and the rocker-levers 22, which pressure, at the moment of disengagement, acted axially upon the sleeve 24 in the direction of the arrow z is transformed, after the de-clutching movement, into a radial pressure according to the arrow z', and is thus practically inactive (Fig. 6). The cams 30 have slid during this movement below the rocker-levers 23, and the sleeve 24 has not communicated any further movement to the individual clutch of the hollow shaft 33, so that this clutch remains disengaged and the sleeve is not subjected to the pressure of its springs 16. As the slopes of cams 28 extend between transverse planes behind the transverse planes of the slopes of the cams 29, the sleeve 24 has not communicated any movement to the individual clutch of the shaft 1, which has remained in engagement.

When the sleeve 24 is moved by the last third of its de-clutching stroke, the cams 28 of this sleeve cause the rocker-levers 21 to rock, and the latter cause the levers 17 to oscillate, again as illustrated in Fig. 6. The levers 17 pull the rods 13 back, and the latter throw the pressure plate 5 out of clutching. The driven plate 2 and the shaft 1 are thus released. The pressure exerted by the springs 16 of this individual clutch upon the sleeve 24 through the medium of the rods 13, the levers 17 and the rocker-levers 21, which pressure, at the moment of disengagement, acted axially in the direction of the arrow z is likewise transformed into a radial pressure in the direction of the arrow z' after the disengagement and is thus practically inactive (Fig. 6). The cams 30 and 29 have slid during this movement of de-clutching, below the respective rocker-levers 23 and 22 and the sleeve 24 has not communicated any further movement to the individual clutches of shafts 33 and 19, thus maintaining these clutches disengaged and without being subjected to the pressure of their springs 16. The multiple clutch is now completely disengaged.

During the oppositely directed stroke of the sleeve 24 in three similar successive periods of clutching, the longitudinal cams of the sleeve 24 successively release the levers of the individual clutches, first of the shaft 1, then of the hollow shaft 19 and finally of the hollow shaft 33, without the sleeve 24 communicating any further movement to the individual clutches already engaged, whilst engaging the following one, and without the sleeve being subjected to the pressure of the springs 16 of the individual clutch or clutches still to be engaged.

The multiple clutch can be carried into practice with other arrangements of the levers, rocker-levers and longitudinal cams on the release sleeve, whilst still maintaining the use of the combination according to the present invention. By way of example, Fig. 8 represents a different disposition of the longitudinal cams of the release sleeve. In this figure, the rocker-levers p replace the rocker-levers 21, 22 and 23, and the longitudinal cams q replace the cams 28, 29 and 30. The rocker-levers p are arranged like the rocker-levers 21, 22 and 23, but the cams q are reversedly arranged upon the sleeve 24, and consequently, the directions of the clutching and de-clutching strokes of the sleeve 24 are opposite to those in the arrangement according to Figs. 1 to 6.

Fig. 9 represents, likewise by way of example, a different arrangement of the groups of members, each group comprising a lever, a rocker-lever and a longitudinal cam. In this figure, the lever l which replaces a lever 17, 18 or 20, oscillates about its outer end and bears against a rod 13, 14 or 15 at an intermediate point. The longitudinal cams m, which replace the cams 28, 29 and 30, and the rocker-levers n which replace the rocker-levers 21, 22 and 23 are likewise inversed. Consequently, the directions of the de-clutching and clutching strokes of the sleeve 24 are again opposite to those of the sleeve in the arrangement shown in Figs. 1 to 6.

In the multiple clutch as described and illustrated in the drawings, three groups of members, each group comprising a rod, a lever, a rocker-lever and a longitudinal cam, are provided for each individual clutch and are disposed at spaces of 120° with respect to each other; all taken together, they are disposed at spaces of 40° from each other for the whole of the three individual clutches. It is obvious that any number, other than three, of such groups of corresponding members can be provided and that they can be arranged at suitable spaces of degrees with respect to each other, both for each individual clutch and for the whole of the multiple clutch, without departing from the scope of the present invention.

As has been stated in the characteristics of the invention, the multiple clutch can be arranged by the described mechanisms for driving more or less than three concentric shafts, according to the purpose for which the device is to be used. For that purpose, each shaft comprises, as described, an individual clutch, and the individual clutches, the drums of which being connected to each other and being connected together to the flywheel of the engine, are provided as many times as there are shafts to be driven; the groups of members, each group comprising a rod, a lever and a rocker-lever, are arranged as has likewise been described, and are disposed at suitable spaces of degrees with respect to each other, both as regards each individual clutch, and as regards the entity of the multiple clutch; the longitudinal cams of the release sleeve are provided in a suitable number and are arranged at suitable spaces of degrees with respect to each other and comprise slopes cut between as many successive pairs of transverse planes, as there are individual clutches, so that the longitudinal cams corresponding to the rocker-levers of one and the same individual clutch, comprise slopes extending between the same pair of transverse planes.

Having thus described my invention, what I claim as new and desire to secure by Letters Patent is:

1. In a multiple clutch device, in combination, a plurality of individual clutches for driving a plurality of concentric shafts, each clutch comprising a drum, a driven plate and a pressure plate positioned in the drum, the said drums connected to each other and together to the flywheel of the engine, and the said driven plates each carried by one of the concentric shafts, a cover on the drums, levers for each individual clutch disposed radially upon the cover, springs for each individual clutch bearing on the flywheel, rods for each individual clutch disposed over the circumference of the multiple clutch for connecting the levers to their pressure plate and for exerting the pressure of the springs upon them, a common release sleeve comprising an annular portion and longitudinal cams, the said longitudinal cams being provided, towards the annular portion, with slopes cut between successive pairs of transverse planes, the slopes of the cams corresponding to the levers of one and the same individual clutch extending between the same pair of transverse planes, for successively actuating or releasing the levers of the individual clutches, when the sleeve is moved longitudinally in one or the other direction.

2. In a multiple clutch device, in combination, a plurality of individual clutches for driving a plurality of concentric shafts, each clutch comprising a drum, a driven plate and a pressure plate positioned in the drum, the said drums connected to each other and together to the flywheel of the engine, and the said driven plates each carried by one of the concentric shafts, a cover on the drums, levers for each individual clutch disposed radially upon the cover, springs for each individual clutch bearing on the flywheel, rods for each individual clutch disposed over the circumference of the multiple clutch for connecting the levers to their pressure plate and for exerting the pressure of the springs upon them, a common release sleeve comprising an annular portion and longitudinal cams, the said longitudinal cams being provided, towards the annular portion, with slopes cut between successive pairs of transverse planes, the slopes of the cams corresponding to the levers of one and the same individual clutch extending between the same pair of transverse planes, for successively actuating the levers of the individual clutches in order to disengage successively the individual clutches, without communicating further movement to the levers of the individual clutches already disengaged while actuating the levers of the following one.

3. In a multiple clutch device, in combination, a plurality of individual clutches for driving a plurality of concentric shafts, each clutch comprising a drum, a driven plate and a pressure plate positioned in the drum, the said drums connected to each other and together to the flywheel of the engine, and the said driven plates each carried by one of the concentric shafts, a cover on the drums, levers for each individual clutch disposed radially upon the cover, springs for each individual clutch bearing on the flywheel, rods for each individual clutch disposed over the circumference of the multiple clutch for connecting the levers to their pressure plate and for exerting the pressure of the springs upon them, a common release sleeve comprising an annular portion and longitudinal cams, the said longitudinal cams being provided, towards the annular portion, with slopes cut between successive pairs of transverse planes, the slopes of the cams corresponding to the levers of one and the same individual clutch extending between the same pair of transverse planes for successively actuating the levers of the individual clutches in order to disengage successively the individual clutches, without being subjected to the pressure of the springs of the individual clutches already disengaged.

4. In a multiple clutch device, in combination, a plurality of individual clutches for driving a plurality of concentric shafts, each clutch comprising a drum, a driven plate and a pressure plate positioned in the drum, the said drums connected to each other and together to the flywheel of the engine, and the said driven plates each carried by one of the concentric shafts, a cover on the drums, levers for each individual clutch disposed radially upon the cover, springs for each individual clutch bearing on the flywheel, rods for each individual clutch disposed over the circumference of the multiple clutch for connecting the levers to their pressure plate and for exerting the pressure of the springs upon them, a common release sleeve comprising an annular portion and longitudinal cams, the said longitudinal cams being provided, towards the annular portion, with slopes cut between successive pairs of transverse planes, the slopes of the cams corresponding to the levers of one and the same individual clutch extending between the same pair of transverse planes, for successively releasing the levers of the individual clutches in order to engage successively the individual clutches, without communicating further movement to the levers of the individual clutches already engaged while releasing the levers of the following one.

5. In a multiple clutch device, in combination, a plurality of individual clutches for driving a plurality of concentric shafts, each clutch comprising a drum, a driven plate and a pressure plate positioned in the drum, the said drums connected to each other and together to the flywheel of the engine, and the said driven plates each carried by one of the concentric shafts, a cover on the drums, levers for each individual clutch disposed radially upon the cover, springs for each individual clutch bearing on the flywheel, rods for each individual clutch disposed over the circumference of the multiple clutch for connecting the levers to their pressure plate and for exerting the pressure of the springs upon them, a common release sleeve comprising an annular portion and longitudinal cams, the said longitudinal cams being provided, towards the annular portion, with slopes cut between successive pairs of transverse planes, the slopes of the cams corresponding to the levers of one and the same individual clutch extending between the same pair of transverse planes, for successively releasing the levers of the individual clutches in order to engage successively the individual clutches, without being subjected to the pressure of the springs of the individual clutches still to be engaged.

JOSEPH DE BACKER.